R. L. FORD.
DROPPING DEVICE FOR CORN PLANTERS.
APPLICATION FILED MAR. 9, 1912.
1,062,449.
Patented May 20, 1913.
2 SHEETS—SHEET 1.
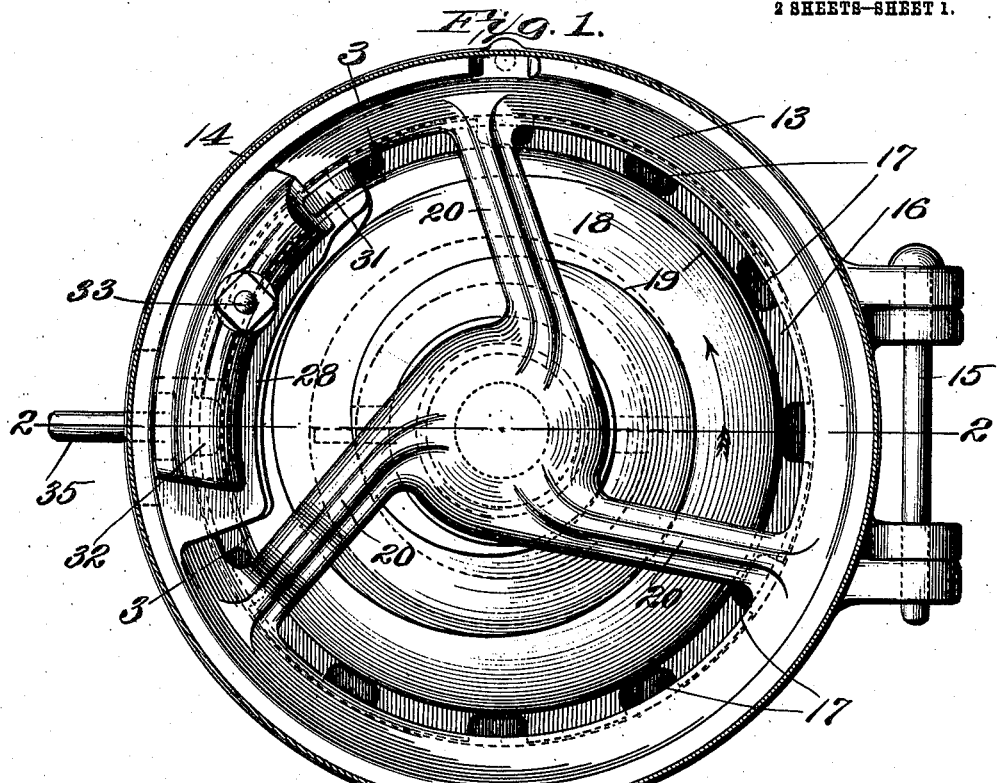
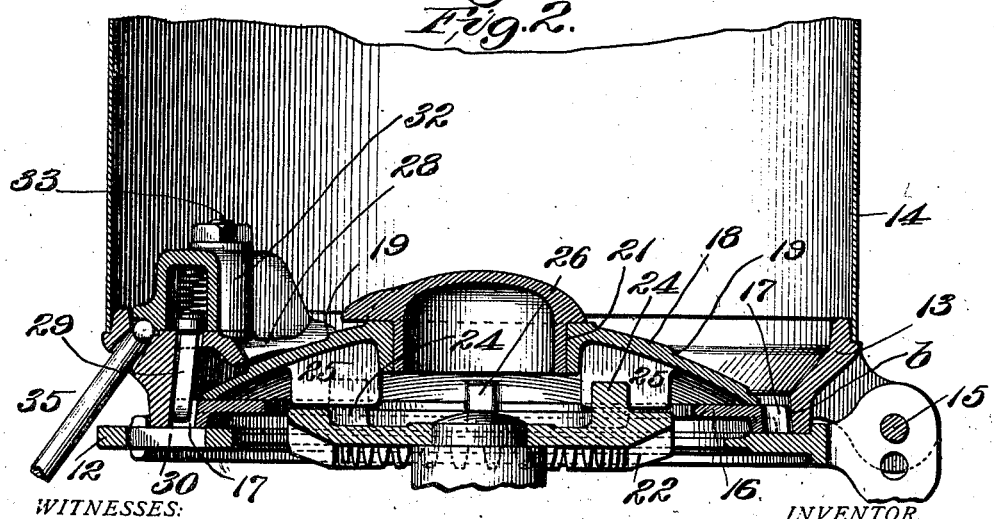
WITNESSES:
INVENTOR.
Ralph L. Ford,
BY John H. Bruninga,
ATTORNEY.

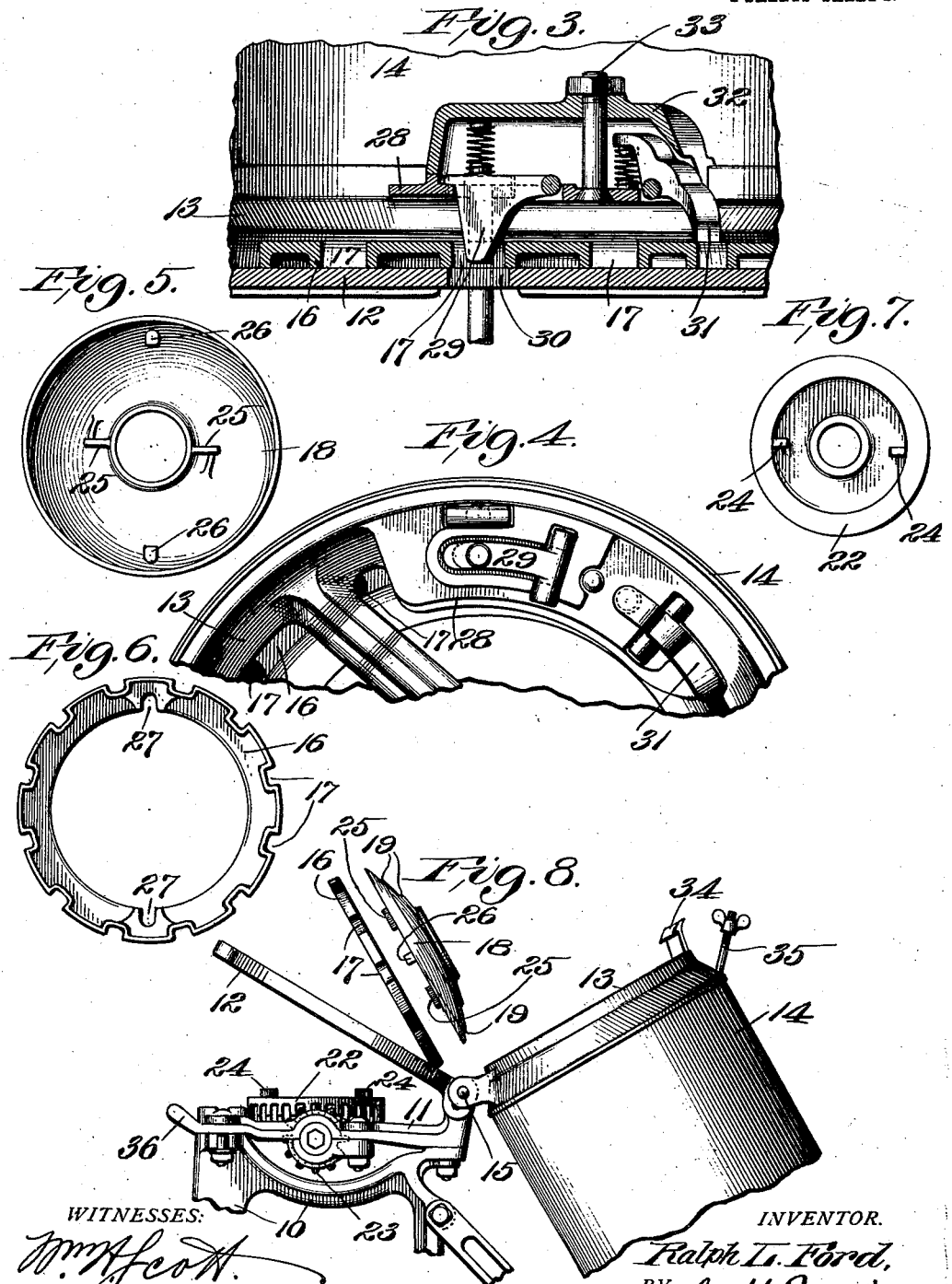

UNITED STATES PATENT OFFICE.

RALPH L. FORD, OF DECATUR, ILLINOIS, ASSIGNOR TO PIONEER IMPLEMENT COMPANY, OF COUNCIL BLUFFS, IOWA, A CORPORATION OF IOWA.

DROPPING DEVICE FOR CORN-PLANTERS.

1,062,449.  Specification of Letters Patent.  Patented May 20, 1913.

Application filed March 9, 1912. Serial No. 682,809.

*To all whom it may concern:*

Be it known that I, RALPH L. FORD, a citizen of the United States, and residing at Decatur, in the county of Macon and State of Illinois, have invented certain new and useful Improvements in Dropping Devices for Corn-Planters, of which the following is a specification.

This invention relates to corn planters, and more particularly to the seed box construction and the devices for dropping the seed.

One of the objects of this invention is to construct dropping means which will be positive and accurate in its operation, in which the seed will be properly distributed to the point where it is to be dropped, and in which bridging and clogging of the seed will be obviated.

Another object is to improve the device as to details of construction so as to cheapen its manufacture by constructing the parts so that the machining can be reduced to a minimum, to obviate binding of parts, and to construct the parts of the device so that they can be easily assembled and disassembled.

Further objects will appear from the detail description taken in connection with the accompanying drawings in which:

Figure 1 is a section through a seed box showing the dropping device in plan, Fig. 2 is a section on the line 2—2 Fig. 1, Fig. 3 is a section on the line 3—3 Fig. 1, Fig. 4 is a detail plan of the parts shown in Fig. 3 with the cap removed, Fig. 5 is a detail of the seed agitating plate, Fig. 6 is a detail of the seed plate, Fig. 7 is a detail of the driving gear, and Fig. 8 is a side elevation of part of a planter showing the parts of the seed dropping device separated.

Referring to the accompanying drawings, 10 designates a part of the frame of a planter, and 11 a bracket bolted thereto. A ring-shaped base plate 12 is pivoted to the bracket 11, and another ring-shaped casting 13 which forms the support for the seed box casing 14 is pivoted to the plate 12 at 15. A ring-shaped seed plate 16 is mounted on the plate 12 and inside of the casting 13 and is provided with recesses or seed cups 17 for receiving the seed. A dome-shaped agitating disk or cover plate 18 rests on the seed plate 16 and is provided with a spirally arranged ridge 19 running from the center to the periphery of the disk. Arms 20 are cast integral with the casting 13 and support a lug 21 forming a center bearing for the agitating plate 18. These arms 20 are arranged tangentially with respect to the axis of the plate 18 for the purpose hereinafter to be described. A driving gear 22 is supported on the bracket 11 and meshes with a gear 23 also supported on the bracket 11 and arranged to be driven in any suitable manner as by means of a hexagonal shaft shown in Fig. 8. The gear 22 is provided with a pair of radially arranged lugs 24 coöperating with similar lugs 25 on the plate 18. The plate 18 is further provided with a pair of lugs 26 spaced 90° from the lugs 25 and coöperating with recesses 27 formed in the seed plate 16.

A bridge 28 is cast integral with the casting 13 and extends over the plates 16 and 18 at the seed dropping point. In one end of this bridge is mounted a spring actuated ejecting device 29 operating through the recesses 17 in the seed plate to eject the seed therefrom. The seed is dropped through a recess 30 in the base plate 12 and into the usual conduit to the ground. A spring actuated cut off 31 is mounted in the other end of the bridge and operates to cut off the seed as the seed plate rotates. A cap 32 is bolted to the bridge by means of a screw 33.

The driving gear 22 operates to drive the agitating plate 18 through the medium of the lugs 24 and 25, and the agitating plate operates to drive the seed plate 17 through the coöperating lugs and recesses 26, 27. It will be noted that the driving connections between the gear and the agitating plate, and between the agitating plate and the seed plate are spaced 90°; this will give a smooth and elastic connection between the parts and equalize the strain on the parts. The driving connections are loose, permitting radial play between the connected members, so that it will be immaterial if the gear, the agitating plate, and the seed plate are slightly out of alinement.

The ridge 19 on the agitating or cover plate 18 operates to force and distribute the seed from the center outwardly and on the seed plate and in the recesses therein. It will also be noted that the inside wall of the casting 13 surrounding the seed plate is inclined outwardly and downwardly as shown at *b*, Fig. 2, while the seed cups are open to this wall so that the seeds in the seed cups will rest against the same. This will insure that the seed will drop into the recesses in the seed plate so that bridging of the seed will be obviated. The head of the center bearing lug 21 extends over the cover plate, and the upper face of this head slopes downwardly toward the cover plate, while the cover plate slopes downwardly from its center bearing toward its periphery and extends up to the seed cups in the seed plate. This will cause the seed to slide down into the seed cups. The distribution of the seed from the center outwardly is also assisted by the arms 20. These arms are arranged tangentially with respect to the axis of the plate 18, and these arms lie closely to the upper downwardly sloping surface of the agitating plate so that as the plate rotates in the direction of the arrow Fig. 1, these arms will assist in distributing the seed outwardly and on the seed plate and in the recesses therein. The agitating plate not only forms a driving connection between the driving gear and the seed plate, but also forms a cover for the seed plate. As the seed plate and agitating plate rotate, the seed is distributed on the seed plate and in the recesses, and the seed in the recesses is carried underneath the bridge 28 and ejected through the recesses 30 as the recesses come underneath the ejector 29.

The parts are so constructed that they can be readily assembled and disassembled, and in view of the arrangement of the driving connections, the amount of machining can be reduced to a minimum as it is not necessary to fit the parts with extreme accuracy. The plate 12 and the casting 13 are arranged to be latched together to form a seed box unit by means of the spring latch 34, and the entire unit is arranged to be bolted to the casting 11 by a bolt 35 on the casting 13 passing through a lug 36 on the bracket 11.

It is obvious that various changes may be made in the details of construction without departing from this invention, and it is therefore to be understood that this invention is not to be limited to the specific construction shown and described.

Having thus described the invention what is claimed is:

1. In a planter, a rotary seed agitating member having a ridge on its upper surface extending in a spiral completely around said member.

2. In a planter, a rotary seed agitating member having its upper surface sloping downward toward its periphery and having a ridge on said upper surface extending in a spiral from its center to its periphery.

3. In a planter, the combination with a rotary seed plate having seed cups at its outer periphery, of a cover plate resting on and movable with said seed plate, arms extending over said cover plate, and a downwardly extending center bearing for said cover plate carried by said arms, said center bearing having a downwardly sloping head extending over said cover plate, the upper surface of said cover plate sloping downwardly from said center bearing toward its periphery.

4. In a planter, the combination with a rotary seed plate having seed cups at its outer periphery, of a cover plate movable therewith and having its upper surface sloping downward toward its periphery, and arms arranged tangentially and above said cover plate and arranged to coöperate with the sloping portion thereof to distribute the seed outwardly.

5. In a planter, the combination with a seed plate, of a cover plate having an outwardly extending ridge on its upper surface, and an arm extending across the upper surface of said cover plate and across the ridge thereon and arranged to coöperate with said cover plate to distribute the seed outwardly.

6. In a planter, the combination with a seed plate, of a cover plate having its upper surface sloping downward toward its periphery and having an outwardly extending ridge on said upper surface, and an arm extending across the upper surface of said cover plate and across the ridge thereon and arranged to coöperate with said cover plate to distribute the seed outwardly.

7. In a planter, the combination with a seed box having an inside wall, of a rotatable seed plate having seed cups in its outer periphery and mounted in said seed box and extending close to the inside wall thereof, a seed agitating cover plate extending over and rotatable with said seed plate, a driving connection between said seed plate and said cover plate constructed to permit radial play between said connected plates, and a driving member having a driving connection with said cover plate.

8. In a planter, the combination with a seed box having an inside wall, of a rotatable seed plate having seed cups in its outer periphery and mounted in said seed box and extending close to the inside wall thereof, a seed agitating cover plate resting on, extending over, and rotatable with said seed plate, a driving connection between said seed plate and said cover plate, a driving member, and a driving connection between said driving member and said cover plate, said driving connections being constructed to permit radial play between the connected members, and the driving connection between said seed plate and said cover plate being made at points removed ninety degrees from the points of connection between said cover plate and said driving member.

9. In a planter, the combination with a seed box, of a seed plate therein, a seed agitating plate mounted above and covering said seed plate and having a ridge on its upper surface, arms mounted above said agitating plate and coöperating therewith to distribute the seed outwardly, and a bearing for said agitating plate supported by said arms.

10. In a planter, the combination with a seed box, of a movable seed plate therein and a seed agitating plate resting on and forming a cover for said seed plate, the seed box having an inside seed engaging wall surrounding said seed plate and inclined outwardly and downwardly, said seed plate having seed cups in its outer periphery open to said wall.

In testimony whereof I affix my signature in presence of two witnesses.

RALPH L. FORD.

Witnesses:
A. M. WIDICK,
J. FRANK DAVIS.